United States Patent [19]
Reast

[11] Patent Number: 5,560,590
[45] Date of Patent: Oct. 1, 1996

[54] FRICTION CONTROL SUSPENSION ASSEMBLY AND FRICTION CONTROL DEVICE FOR VEHICLES

[75] Inventor: John B. Reast, Bedford, United Kingdom

[73] Assignee: Detroit Steel Products Company, Inc., Morristown, Ind.

[21] Appl. No.: 395,060

[22] Filed: Feb. 27, 1995

Related U.S. Application Data

[63] Continuation-in-part of Ser. No. 916,099, filed as PCT/GB91/00110, Jan. 25, 1991, published as WO91/11616, abandoned.

[30]  Foreign Application Priority Data

Jan. 26, 1990  [GB]  United Kingdom ............... 9001849

[51] Int. Cl.$^6$ ........................................... B60G 11/34
[52] U.S. Cl. .................. 267/30; 267/37.4; 267/49; 267/267; 267/269
[58] Field of Search .................. 267/36.1, 37.4, 267/47, 48, 49, 30, 141.2, 141.3, 141.4, 141.5, 141.1, 153, 263, 267, 269, 294, 37.2, 40, 50, 262, 270

[56]  References Cited

U.S. PATENT DOCUMENTS

| | | | |
|---|---|---|---|
| 1,683,075 | 9/1928 | Hughes | 267/48 |
| 2,621,922 | 12/1952 | Watson | 267/49 |
| 3,762,734 | 10/1973 | Vogel | 267/153 |
| 4,418,898 | 12/1983 | Atsumi et al. | 267/153 |

*Primary Examiner*—Lee Young
*Attorney, Agent, or Firm*—William Lloyd Clayborn; John M. Cone

[57]  ABSTRACT

A vehicle suspension friction control assembly includes vehicle suspension having at least two elements which are slidable with respect to each other in the fore-and-aft direction thereof. The assembly also includes a friction control device comprising a resiliently deformable member which is located between the suspension elements and means for limiting deformation of the deformable member to a predetermined degree in the fore-and-aft direction of the suspension elements. The suspension elements are slidable with respect to each other against friction when the deformable member has been deformed to the predetermined limited degree.

33 Claims, 6 Drawing Sheets

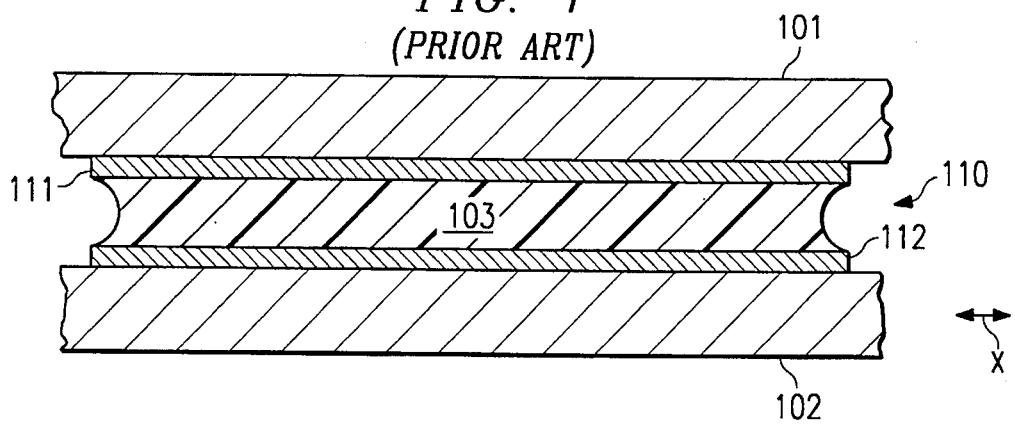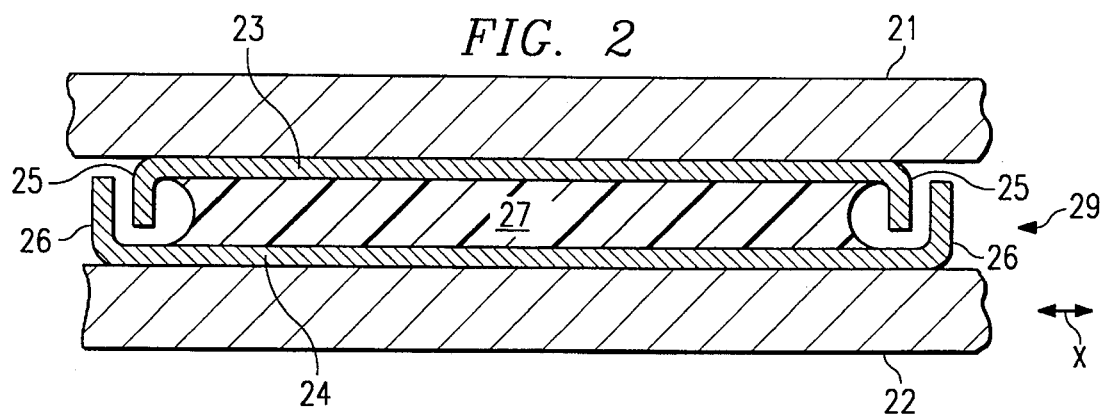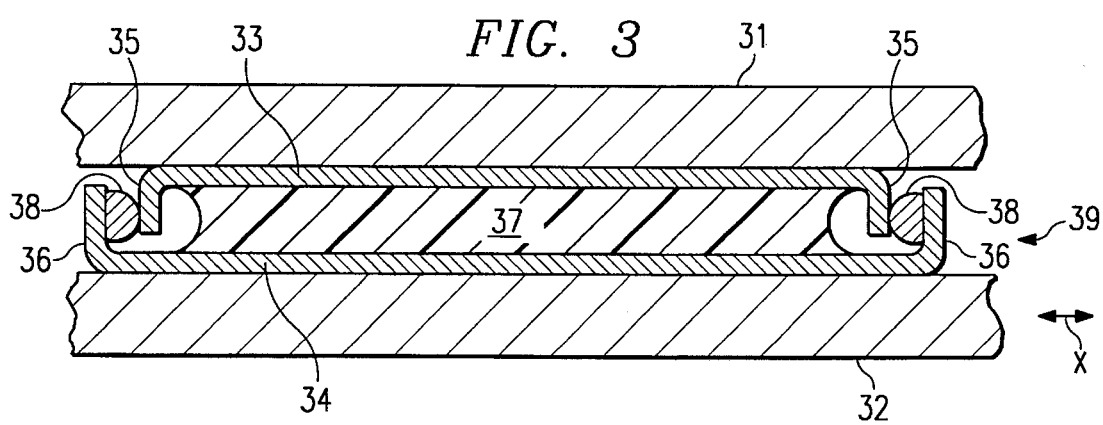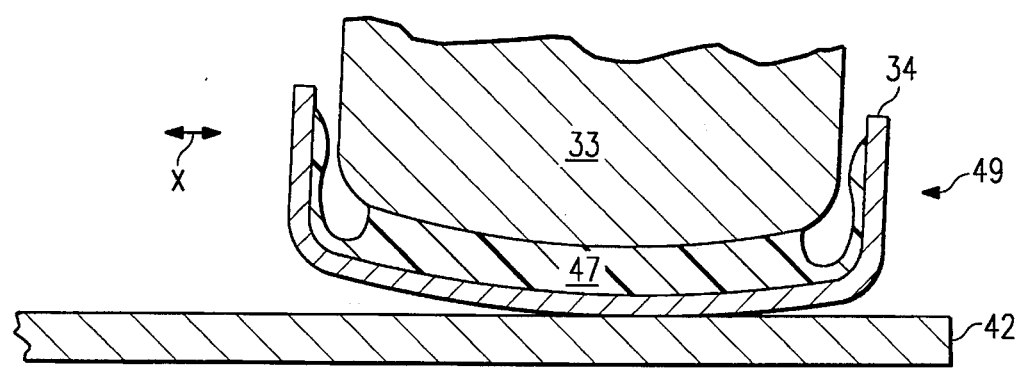

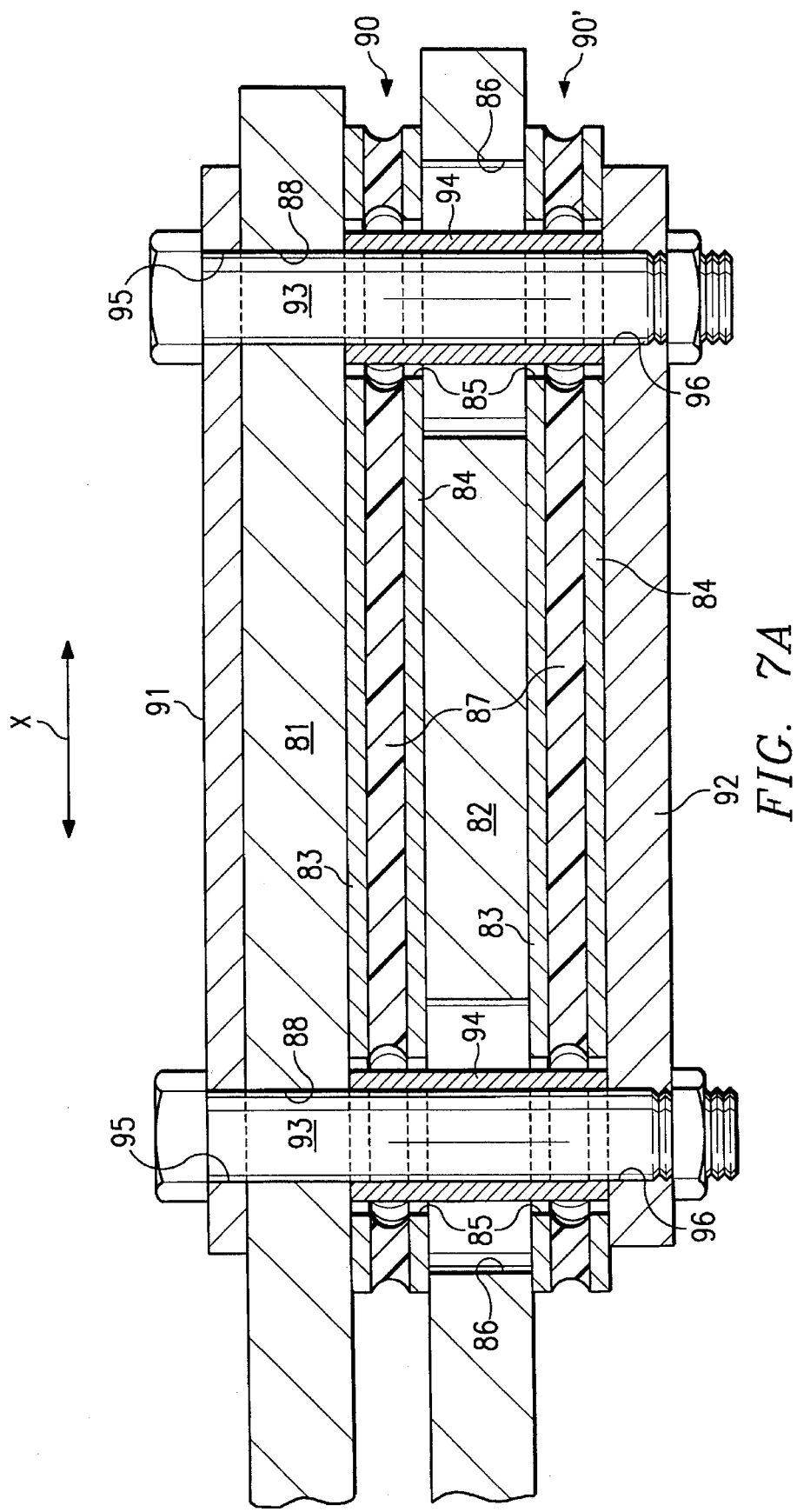

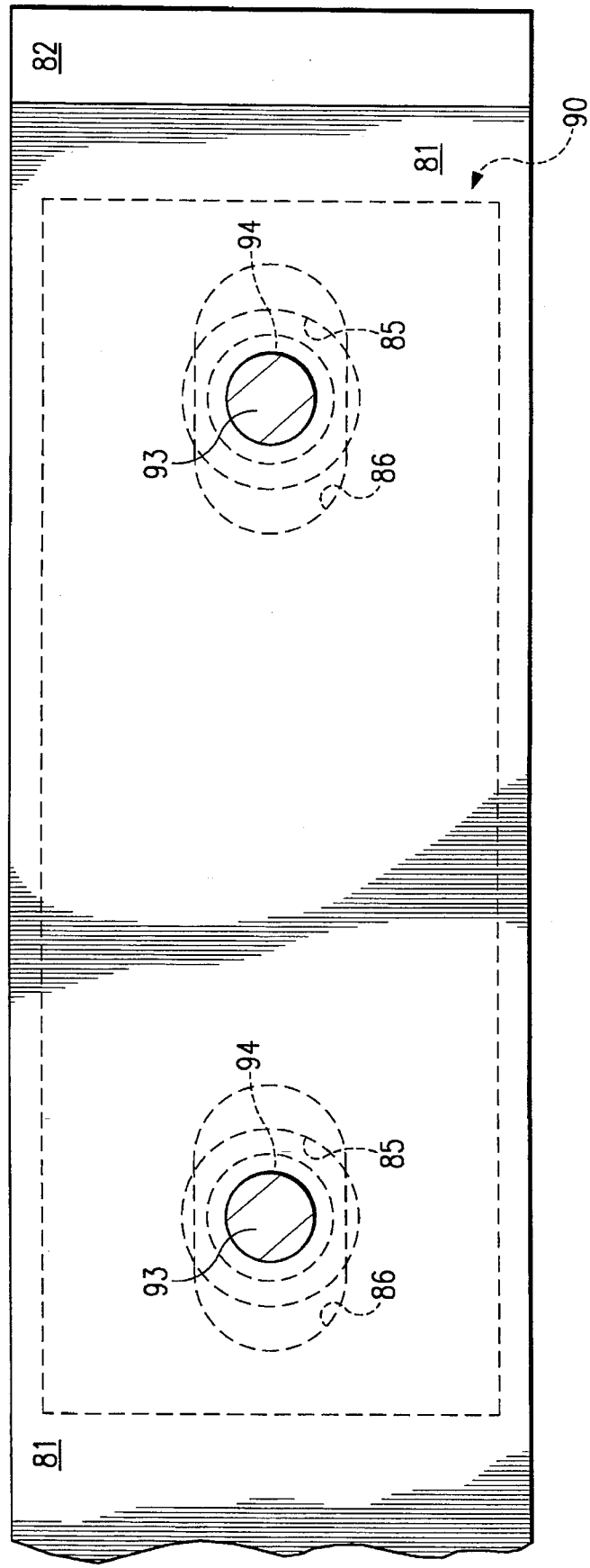

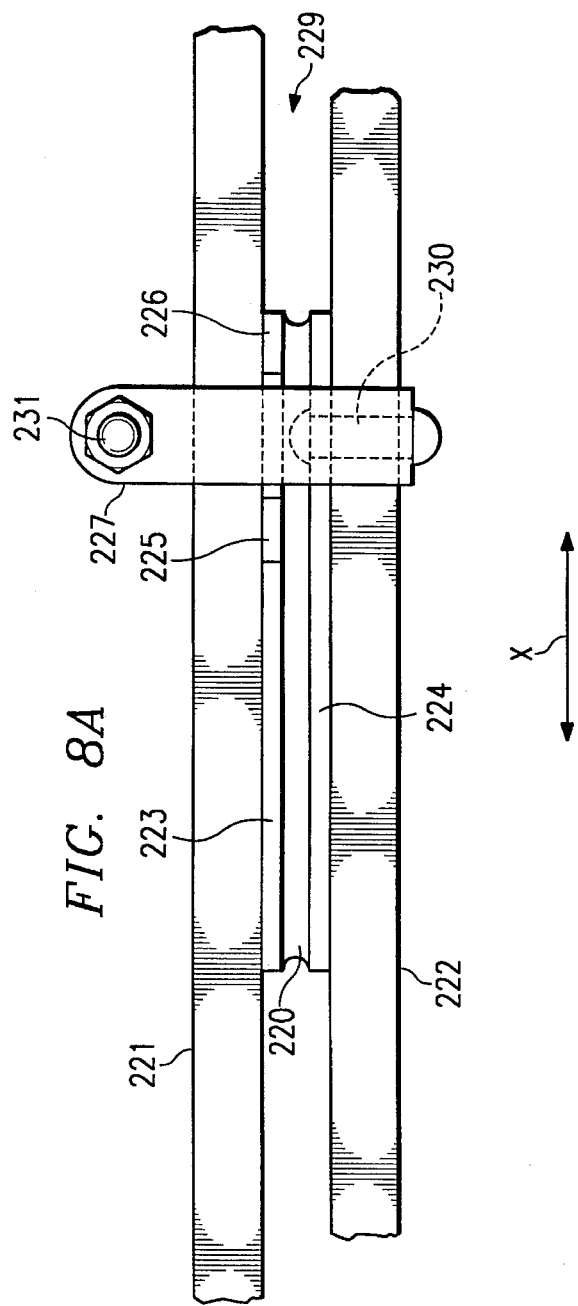
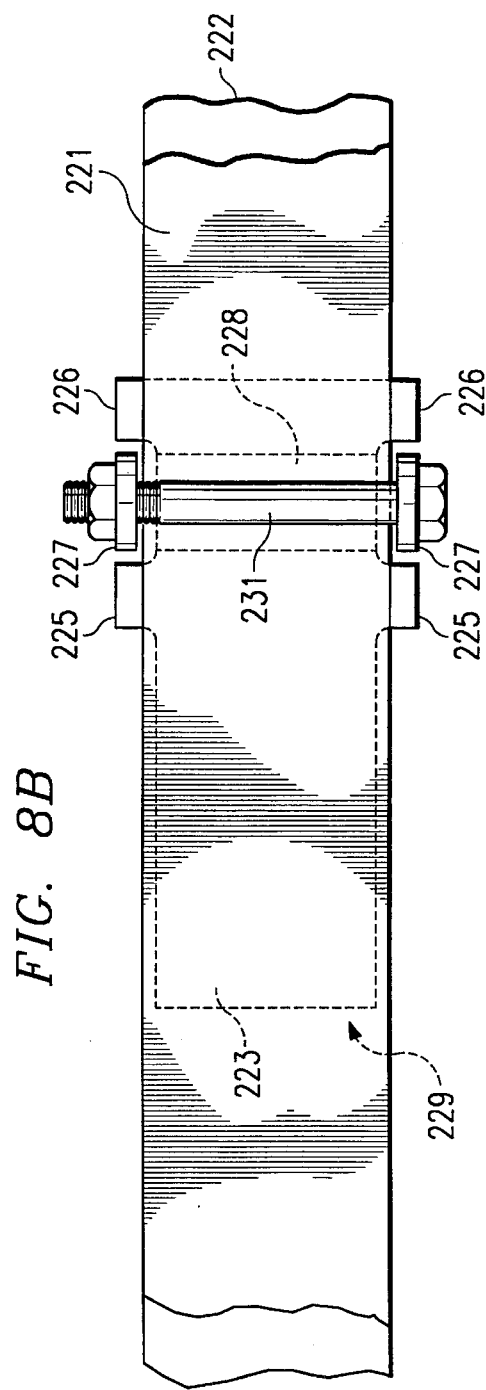

FRICTION CONTROL SUSPENSION ASSEMBLY AND FRICTION CONTROL DEVICE FOR VEHICLES

CROSS REFERENCES TO RELATED APPLICATIONS

This application is a continuation-in-part of U.S. patent application Ser. No. 07/916,099 filed on 27th Apr. 1993, now abandoned, and derived from International Patent Application No. PCT/GB91/00110 (International Publication No. WO 91/11616) dated 25th Jan. 1991 and claiming priority from British Patent Application No. 9001849.0 dated 26th Jan. 1990.

BACKGROUND OF THE INVENTION

The invention relates to a suspension friction control assembly and friction control device for vehicles, particularly heavy commercial vehicles, which provide low or negligible friction for small movements of the suspension but higher frictional forces for large deflections of the suspension.

In known leaf spring vehicle suspensions, the friction between the spring leaves and between the springs and their mountings has both advantages and disadvantages, especially when applied to heavy commercial vehicles. There are existing devices for increasing and/or decreasing this friction for different applications, although such devices tend to be a compromise, providing the higher or lower friction characteristic over the whole range of suspension deflections.

Low friction improves the isolation ride of a vehicle, especially at small load variations or deflections. For instance, when travelling on a relatively smooth road, any static friction tends to lock the suspension up, with small input variations causing the tires of the vehicle to deflect. As the vehicle tires are virtually undamped, the vehicle tends to oscillate on the tires, thereby providing an unpleasant ride.

A disadvantage with known low friction control, leaf spring suspension is that sophisticated, highly durable dampers are required to control adequately the motions of the vehicle. To be fully effective, such dampers ideally require various settings to suit the different loading conditions to which the suspensions are subjected. Also, with low friction control, leaf spring suspensions, the rate of the vehicle movement, especially in the roll mode, is generally too high under the dynamic loadings which occur when the vehicle is manoeuvring. This often necessitates the use of stabiliser/anti-roll bars which tend to reduce the quality and comfort of the vehicle ride by stiffening the wheel rate when only one wheel is deflected.

On commercial vehicles, where the distribution of load between axles varies considerably in dependence upon the particular application, a high friction spring arrangement tends to dampen any actual frequency combinations which can cause severe ride and handling problems. Therefore, high friction spring arrangements tend to be more adaptable over the practical ranges of vehicle applications.

The present trend for leaf spring suspensions is towards spring leaves of parabolic tapering thickness which can be designed to produce more durable assemblies, but which tend to have low inter-leaf friction. As indicated above, this tends to give, on the one hand, advantages in the vehicle ride for small input variations but, on the other hand, the disadvantages discussed above for larger deflections.

An attempt has been made to overcome the disadvantages of suspension friction by providing between those parts of a spring which need to contact each other, but which also need to slide with respect to each other, such as the spring and its mounting and/or adjacent spring leaves, an elastomeric member. By a "shearing" action, the elastomeric material of such a member is able to accommodate the differential sliding motion between the spring and its mounting and/or adjacent spring leaves. However, these shear deflection members also suffer from the disadvantages of the lower friction, similar to those discussed above.

Accordingly, it is an object of the present invention to provide, a vehicle suspension incorporating a friction control device which overcomes, or at least substantially reduces, the disadvantages associated with the know suspension arrangement discussed above.

Thus, one aspect of the invention provides a vehicle suspension friction control assembly comprising a vehicle suspension having at least two components which are movable with respect to each other in the fore-and-aft direction of the suspension, and of which at least one component is a spring leaf, and a friction control device including a resiliently deformable member which is located between at least two of the suspension components and means for limiting deformation of the friction control member in the fore-and-aft direction of the suspension to a predetermined limited degree which is less than the inherent deformation limit of the resiliently deformable member, wherein the spring leaf and another of the suspension components are movable with respect to each other against sliding friction in said fore-and-aft direction subsequent to the member having been deformed to said predetermined limited degree.

Preferably, the means for limiting deformation of the member to said predetermined limited degree defines a positive stop therefor. Also, the deformation limiting means may include means for effecting a progressively increasing resistance to deformation of the member, terminating in a positive stop therefor.

In a preferred embodiment of inventive assembly, the friction control device includes a pair of generally parallel plates between which the resiliently deformable member is secured and of which one of the plates is in engagement with a spring leaf, and wherein said deformation limiting means includes respective means arranged on the plates to interengage with each other when the friction control member has been deformed to its predetermined limited degree, which defines a positive stop therefor, and whereby any subsequent relative movement between the spring leaf and the other suspension component in the fore-and-aft direction of the suspension is against sliding friction between the spring leaf and said one plate of the friction control device. The plate interengagement means may comprise opposed ends of each plate being bent inwardly with respect thereto, such that corresponding pairs of respective bent plate ends can interengage, to provide said positive stop when the member has been deformed to its predetermined limited degree. Progressively increasing resistance means can compromise a resiliently deformable element arranged to act between the plates, in which case, the resiliently deformable element may be arranged to act between respective cooperating pairs of interengageable bent plate ends.

In another embodiment, the resiliently deformable member is secured directly to a first one of the suspension components and to a plate, another suspension component and the plate being slidable with respect to each other against friction when the deformable member has been deformed to its predetermined limited degree. The other suspension component may be a spring leaf of the suspension. Also, the suspension component to which the member is secured directly may be another spring leaf of the suspension.

At least two components of the vehicle suspension may be respective leaves of a multi-leaf spring of which at least one is arranged to slide in frictional engagement with a corresponding one of the pair of parallel plates of the friction control device when the member has been deformed to its predetermined limiting degree.

Means may be used to clamp the leaves of the multi-leaf spring together, with another resilient element located between the clamping means and at least one of the spring leaves. The other resilient element may be secured to a clamp plate of the clamping means.

In another embodiment, the vehicle suspension comprises a cam spring suspension arrangement with the resiliently deformable member being secured between confronting faces of upper and lower components of a frame mounting bracket of the cam spring suspension arrangement, and wherein the lower frame mounting bracket component is arranged upon the spring leaf of the suspension, such that relative movement between the frame mounting bracket and spring leaf which would otherwise cause further deformation of the resiliently deformable member beyond said predetermined limited degree, causes slide motion, against friction, between the lower frame mounting bracket component and the spring leaf.

In a further embodiment of the invention, the vehicle suspension comprises a pair of spring leaves with the friction control device located therebetween, the spring leaves and the friction control device being secured together by an elongate clamping member passing through respective holes in the leaves and device with clearance between the elongate clamping member and the respective peripheries of the hole in the device and the hole in at least one of the spring leaves, the clearance, in the fore-and-aft direction of the suspension, between the elongate clamping member and the periphery of the hole in the least one spring leaf being greater than that between the elongate member and the periphery of the hole in the friction control device, the deformation limiting means being defined by the elongate clamping member and the periphery of the hole in the friction control device with which the elongate clamping member engages when the resiliently deformable member has been deformed to the predetermined limited degree, at least one of the spring leaves being movable with respect to each other in the fore-and-aft direction of the suspension against sliding friction between the at least one spring leaf and the friction control device when the resiliently deformable member has been deformed to the predetermined limited degree.

Again, the friction control device may include a pair of generally parallel plates between which the resiliently deformable member is secured. Also, only one of the spring leaves may have a hole with clearance between the elongate clamping member and the periphery thereof and the resiliently deformable member may be secured directly to the other spring leaf and to a plate which is slidable against friction with respect to the one of the spring leaves when the deformable member has been deformed to the predetermined limited degree. The spring leaves and friction control device may be clamped together by a pair of opposed clamping plates secured together in clamping relationship by the elongate clamping member. Preferably two elongate clamping members are used.

A second friction control device may be located between one of the spring leaves and the adjacent clamping plate and the resiliently deformable member of the second friction control device may be secured directly to the adjacent clamping plate.

Further, only one of the spring leaves may have a hole with clearance between the elongate clamping member and the periphery thereof, wherein the resiliently deformable member of the first friction control device may be secured directly to the second spring leaf and to a plate which is slidable against friction with respect to the first spring leave when the deformable member has been deformed to the predetermined limited degree.

The resiliently deformable member is preferably made of an elastomeric material which may be either natural or synthetic, or, indeed, any other suitable, resiliently deformable material.

In order that the invention may be more fully understood, preferred embodiments in accordance therewith will now be described by way of example and with reference to the accompanying drawings in which:

BRIEF DESCRIPTION OF THE DRAWINGS

FIG. 1 is a side elevation in section of a prior art leaf spring suspension friction control assembly with a prior art friction control device located between two spring leaves of the assembly;

FIG. 2 is a side elevation in section of a first embodiment of a leaf spring suspension friction control assembly in accordance with the invention, the assembly including a friction control device, also in accordance with the invention, located between two spring leaves of the assembly;

FIG. 3 is a side elevation in section of a second embodiment of a leaf spring suspension friction control assembly in accordance with the invention, the assembly including a friction control device, also in accordance with the invention, located between two spring leaves of the assembly;

FIG. 4 is a side elevation in section of a third embodiment of leaf spring suspension friction control assembly in accordance with the invention, the assembly including a friction control device, also in accordance with the invention, located between a spring leaf and a mounting bracket of the assembly;

FIGS. 7A and 7B are respective cross-sectional, side elevational and plan views of a fifth embodiment of a leaf spring suspension friction control assembly, the assembly including two friction control devices in accordance with the invention;

FIGS. 8A and 8B are respective side elevational and plan views of a sixth embodiment of a leaf spring suspension friction control assembly in accordance the assembly including with an inventive friction control device in accordance with the invention.

Figure 5:
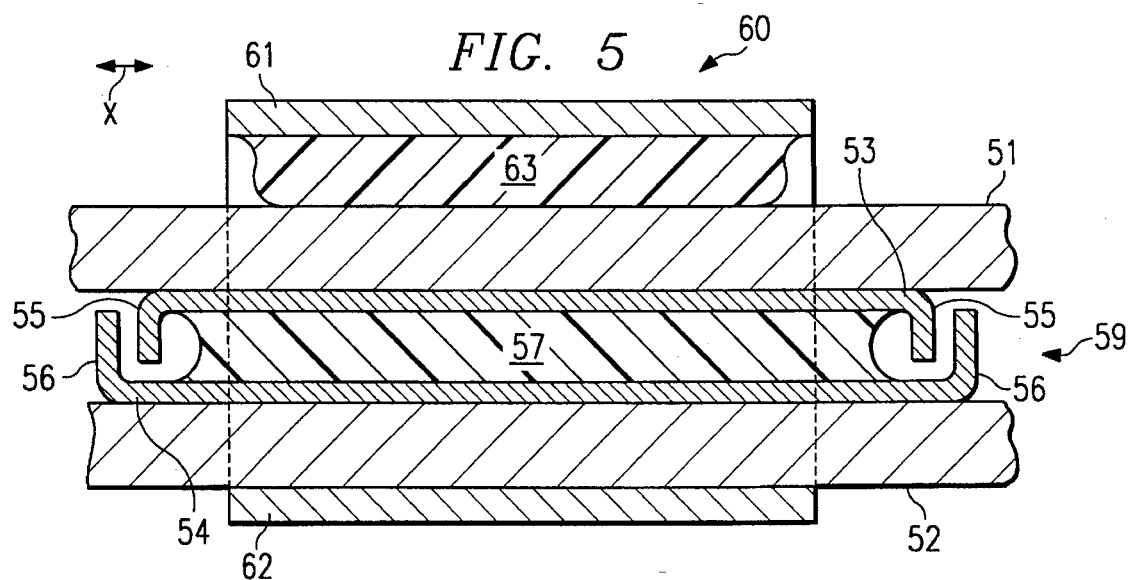
FIG. 5 is a side elevation in section of a modified form of the first embodiment of the leaf spring suspension friction control assembly and friction control device shown in FIG. 2.

Referring firstly to FIG. 1 of the drawings, a prior art leaf spring suspension friction control assembly comprises upper and lower leaves 101, 102 of a leaf spring vehicle suspension, between which is located a known form of friction control device 110 consisting of respective upper and lower metal plates 111, 112 between which is secured by any suitable means a resiliently deformable member 103.

This prior art suspension assembly is such that, under working conditions of the vehicle suspension, the upper leaf 101 and the upper metal plate 111 cannot, or are highly unlikely to, slide with respect to each other and, in any case, the lower leaf 102 and lower metal plate 112 are firmly secured to each other. Thus, any relative motion taking place in the fore-and-aft direction of the vehicle, as indicated by the double headed arrow X, between the upper and lower spring leaves 101, 102 is resisted by resilient deformation of the member 103 by the corresponding shearing force exerted thereupon in the fore-and-aft direction X.

During normal operation of the suspension shown in FIG. 1, spring deflections and the associated differential movement between the upper and lower spring leaves 101, 102 will not provide sufficient shear forces to cause the upper plate 111, which is usually constructed of steel to slide against friction with respect to the upper spring leaf 101.

The main, and often one of the only times that sliding takes place between the upper spring leaf 101 and the upper plate 111 is just after initial assembly of the suspension and its installation in a vehicle. During assembly, the spring is in its free state, which is close to the extreme limit of its total unloaded deflection in one direction. When the vehicle suspension operates under loaded conditions and is deflected towards the extreme limit of deflection in the other direction, the upper plate 111 slides with respect to the upper leaf 101. This movement takes place before any substantial corrosion of the metal suspension components builds up. After this initial movement, as the metal suspension components rarely move otherwise, even under corrosion free conditions, corrosion builds up, increasing even further the force required to cause relative movement between the spring leaf 101 and the upper plate 111 of the device 110. As the deformation of the resiliently deformable member 103 is limited only by the member's inherent deformation limit, the shear forces created by operation of the suspension can be high enough to damage the elastomeric or other rubber-like material from which the deformable member 103 is made, resulting in poor reliability and reduced durability.

Therefore, the components of the suspension are designed to have sufficient thickness of material for the member 103 to reduce the shear forces thereon under normal suspension operation. This thickness often means that under direct spring loads, the plates 111, 112 have to be bonded to the member 103 to provide sufficient support therefor, as well as adequate durability.

The thickness of the resiliently deformable member 103 could be reduced, thus creating a higher shear force under smaller deflections of the spring leaves 101, 102 and possibly enabling the upper plate 111 and/or the lower plate 112, if not fixed, to slide against friction with respect to its associated spring leaf 101 and 102. However, if this arrangement is attempted, then it would be difficult to control the shear rate of the deformable member 103, thus creating an unpredictable transition point between shearing deformation of the member 103 and any subsequent sliding against friction between the upper and/or lower plates 111, 112 and associated spring leaf 101, 102. Also, the shear forces would be so high that the resiliently deformable member 103 would become very unreliable in operation and would have low durability.

Thus, on medium and heavy trucks incorporating the prior art device 110 in their leaf spring suspension systems, the standard practice is to provide deformable members 103 of sufficient thickness that the plates 111, 112 never move from their zero shear positions relative to the member 103, even when the suspensions are new and corrosion-free, during normal operating deflections of the suspension springs.

Also, the required amount (thickness) and quality of the elastomeric or other rubber-like material from which the resiliently deformable member 103 is made to withstand the high shear forces involved means that this prior art form of friction control device 110 is expensive to use. Also, expensive, sophisticated dampers must be used with this lower friction arrangement, and the use of stabilizer means, such as stabilizer bars or tubes, for controlling the vehicle during larger spring and suspension deflections also increases considerably the cost of the use of the prior art devices and suspension assemblies discussed above. Further, the use of heavier dampers and stabilizer bars or tubes also reduces the quality of the primary isolation of the springs, which cancels out much of the effectiveness of the originally-required feature discussed above.

Accordingly, the problem to be solved involves designing a leaf spring suspension friction control assembly, and associated friction control device for use therein, which can accurately vary the friction characteristic of the vehicle suspension, depending upon road and vehicle operating conditions. Also, such a suspension assembly and device is required to be able to tune the suspension such that the transition between shearing deformation of the resiliently deformable member of the friction control device and the sliding against friction between the device and either or both the spring leaves, namely, when the frictional force between the device and spring leaf(ves) is less than the shear resistance of the deformable member, can be:

determined accurately;

changed easily and simply during development;

simple and economical to manufacture; and varied in design to suit various installations and operating conditions.

Also, the friction control device, and particularly its resiliently deformable member, should be as durable as the other components of the suspension assembly.

Accordingly, the present invention sets out to provide a friction leaf spring suspension assembly and friction control device which overcomes, or at least substantially reduces, the disadvantages of the prior art assembly and device 110 discussed above in relation to FIG. 1 of the drawings and, also, to provide a friction control leaf spring suspension assembly and associated friction control device which constitute a considerable improvement in leaf spring suspension technology.

Accordingly, various embodiments of such improved and innovative friction leaf spring suspension assemblies and friction control devices will now be discussed in detail with reference to the remainder of the FIGS. 2 to 9 of the accompanying drawings.

DESCRIPTION OF THE PREFERRED EMBODIMENTS

First embodiments of inventive leaf spring suspension friction control assembly and friction control device as shown in FIG. 2, limit the fore-and-aft deformation of the resiliently deformable member 27 of the friction control device 29. A pair of adjacent upper and lower leaves 21, 22 of a leaf spring vehicle suspension are separated by the friction control device 29 which, as in the case of the prior art device 110 described above, also comprises a pair of upper and lower metal plates 23, 24. However, the opposed ends 25 of the upper plate 23 are bent downwardly and, similarly, the opposed ends 26 of the lower plate 24 are bent upwardly, such that they overlap with but are spaced from the downwardly extending ends 25 of the upper plate 23, the ends 25 thus being located within the confines of the upwardly extending ends 26 of the lower plate 24. Thus, respective gaps are provided between the adjacent plate ends 25, 26. In this manner, any fore-and-aft deformation of the associated resiliently deformable member 27 in the direction of the double headed arrow X, as a consequence of certain working conditions of the vehicle suspension, is limited to a predetermined degree or amount by a positive stop provided by engagement of one end 25 of the upper plate 23 with the associated end 26 of the lower plate 24 or vice versa. After such restricted shear deformation of the member 27 in the fore-and-aft direction X, any further relative movement between the two leaves 21, 22 is effected by sliding motion against friction between the leaf 21, 22 and associated plate 23, 24 of the friction control device 29. Thus, this positive stop provides a predetermined transition point between initial but limiting shearing deformation of the member 27 and any subsequent sliding against friction between the plate 23 or 24 and leaf 21 or 22 in the direction X, when the frictional resistance between the plate and leaf is thus less than the limiting resistance provided by the inter-engagement of the ends 25, 26 of the plates 23, 24.

A second embodiment of inventive leaf spring suspension friction control assembly and friction control device is illustrated in FIG. 3, this being similar to the first embodiment described above in relation to FIG. 2, except that the restricted shear deformation of the resiliently deformable member 37 of the device 39 is subjected to a progressive resistance prior to its being subjected to a positive stop, for any subsequent relative fore-and-aft movement against friction between the upper and/or lower leaves 31, 32 and plates 33 and/or 34. Such progressive resistance is provided by a resiliently deformable element 38 positioned between each of the pair of downwardly and upwardly extending ends 35, 36 of respective upper and lower metal plates 33, 34 of the friction control device 39.

For sufficient fore-and-aft relative movement between the upper and lower plates 33, 34, resiliently deformable compression of the associated element 38 which provides the initial progressive resistance, will eventually result in such movement being brought to a positive stop.

Any further relative movement in the fore-and-aft direction between the upper and lower leaves 31, 32 of the suspension which, in the prior art arrangement, would otherwise result in greater shearing deformation of the member 37, causes the confronting faces of the upper/lower leaf 31, 32 and upper/lower plate 33, 34 to move slidably against friction with respect to each other, thereby generating the necessary friction therebetween.

A third embodiment of inventive leaf spring suspension friction control assembly and friction control device is shown in FIG. 4, as indicated generally at 49, applied to the adjacent faces of a frame mounting bracket of a cam spring suspension arrangement.

In this third embodiment, the resiliently deformable member 47 is secured between the confronting faces of the two components 33, 34 of the bracket which effectively replace the upper and lower plates 23, 24 and 33, 34 of the respective devices 29, 39 of the first two inventive embodiments described above in relation to FIG. 2 and 3.

It is to be noted that in this third embodiment, the resiliently deformable material of the member 47 extends around the inside face of the lower bracket component 34, such that it is located between that component and the upper component 33, thereby providing limited deformation of the member 47 in a progressive restricted manner before a positive step is achieved, for any further relative movement which would otherwise occur between the two components 33, 34, in the fore-and-aft direction of the vehicle with which this particular suspension arrangement is associated. Any relative movement between the mounting bracket and associated spring leaf 42 which, in the prior art arrangement, would otherwise cause further deformation of the member 47 of the friction control device 49, is now only allowed to occur by sliding motion, against friction, between the lower component 34 and the spring leaf 42. Thus, once again, a transition point is achieved by the positive stop, which prevents any further deformation of the member 47, and any subsequent sliding against friction between the component 34 and leaf 42.

The fourth embodiment of inventive leaf spring suspension friction control assembly and friction control device is illustrated in FIG. 5 of the drawings, it being similar in construction and operation to the first embodiment of FIG. 2, except that an additional, external clamp 60 is employed.

The clamp 60 comprises upper and lower clamping plates 61, 62 and is clamped on to upper and lower leaves 51, 52 of a leaf spring vehicle suspension. Between the upper and lower leaves 51, 52 is located a friction control device 59, such as that described above with reference to FIG. 2. Between the upper clamping plate 61 of the clamp 60 and the upper spring leaf 51 is provided a resilient element 62 secured to the plate 61.

This clamping arrangement provided by the clamp 61 serves to force the slidably movable components 51, 59, 52 of the basic leaf spring assembly together, as in the case of conventional friction increasing clamping devices. With the inventive device 59 employed in this arrangement, however, the friction will still be low for small suspension deflections but, as the shear deformation limit of the deformable member 57 applies at higher deflections, the required frictional effect comes into play at a higher value than that associated with the conventional leaf spring arrangement without the inventive friction control device present.

Therefore, when the resiliently deformable member 57 has reached its limit of deformation provided by the positive stop defined by the engagement of an adjacent pair of bent over ends 55,56 of the upper and lower plates 53,54 of the friction control device 59, further relative movement of the spring leaves 51,52 in the fore-and-aft direction X is provided by sliding against friction between the upper and/or lower leaf 51,52 and the upper and/or lower plate 53,54 of the device 59.

As in the case of the embodiment of FIG. 3 discussed above, a resiliently deformable element (not shown) may be provided between each pair of adjacent bent plate ends 55,56 to provide an initial progressive resistance to shearing deformation of the element 57 prior to such deformation reaching its predetermined limit at the positive stop, after which any sliding against friction between the leaf 51,52 and plate 53,54 can occur.

A further application of the inventive device, or indeed the conventional, unlimited deformation device, such as that described above with reference to FIG. 1, might be with radius arms or stabiliser bars associated with leaf springs, such as those described in our co-pending International Patent Application No. PCT/GB90/00436 (Publication No. WO 90/11201) entitled "Vehicle Suspension System".

Figure 6A:
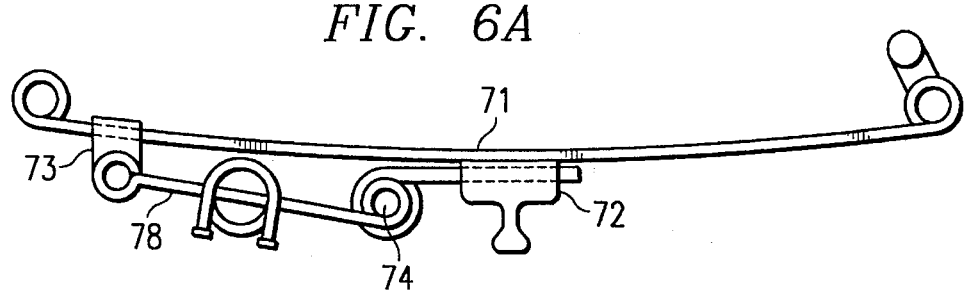
FIGS. 6A and 6B are respective side elevation and plan views of a fourth embodiment of a friction control device used in a particular single leaf spring suspension assembly in accordance with the invention.
Figure 6B:
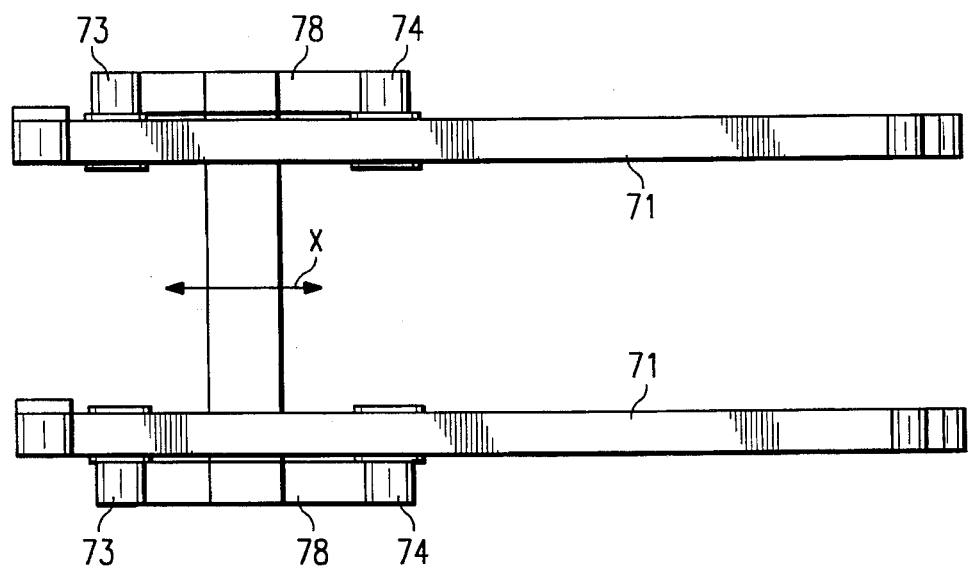

In this arrangement, a radius arm, such as that illustrated at 78 in FIGS. 6A and 6B, could be attached to the spring leaf 71 or to the axle 72 by a clip 73 or bracket 74 or other suitable connecting means which incorporates a friction control device (not shown) of the prior art or, in modified form, in accordance with the invention, as defined and discussed above.

This particular application might be particularly advantageous when employed with single leaf springs, thereby providing a degree of friction which would otherwise be impossible to achieve with a one leaf arrangement. If the geometry and friction are tuned correctly, this particular application could assist in damping out axle torsional vibrations or spring windup oscillations under traction and braking of the vehicle, which normally give rise to problems with single leaf spring suspensions.

Referring now to a fifth embodiment of leaf spring suspension friction control assembly and friction control device in accordance with the invention shown in FIGS. 7A and 7B, upper and lower spring leaves 81,82 have a friction control device 90 located therebetween. Upper and lower clamping plates 91,92 are provided, with another friction control device 90' located between the lower spring leaf 82 and lower clamping plate 92. The assembly is clamped together by a pair of bolts passing through respective holes 95, 88, 85, 86 and 96 in the upper clamping plate 91, the upper spring leaf 81, the friction control devices 90,90', the lower spring leaf 82 and the lower clamping plate 92. The diameters of the holes 85 in the two friction control devices 90,90' are oversized and the holes 86 in the lower spring leaf 82 are elongated with their major dimensional axes being greater than the diameters of the holes 85 in the friction control devices 90,90'. Spacer sleeves 94 for controlling the clamping forces exerted upon the assembly by the bolts 93, are provided on the bolts and abut and extend between the respective lower and upper surfaces of the upper spring leaf 81 and the lower clamping plate 92, through the holes 85 and 86 in the devices 90,90' and the lower spring leaf 82.

Each friction control device 90,90' comprises upper and lower metal plates, 83,84 between which are secured respective, resiliently deformable members 87.

The diameters of the holes 85 in the friction control devices 90,90' accommodate any relative movement between the upper and lower spring leaves 81,82 in the fore-and-aft direction X of the vehicle due to shearing deformation of the resilient members 87 of the or each friction control device 90,90'.

A positive stop for limiting such shearing deformation of the members 87 is provided when the outer surfaces of the spacer sleeves 94 engage the inner peripheral surfaces of the holes 85 in the upper and/or lower plates 83,84 of the devices 90,90'. Thereafter, any subsequent relative movement between the upper and lower spring leaves 81,82 in the fore-and-aft direction X of the vehicle results from sliding against friction between the upper and/or lower leaves 81,82 and the respective upper and/or lower plates 83,84 of the devices 90,90'. Such sliding against friction is accommodated by the elongated holes 86 in the lower spring leaf 82.

In a modification of this fifth embodiment of assembly, the upper plate 83 of the upper friction control device 90 may be secured firmly to the upper leaf 81 and the lower plate 84 of the lower device 90' may be secured firmly to the lower clamping plate 92. Alternatively, the upper plate 83 of the upper device 90 and the lower plate 84 of the lower device may be omitted altogether, with the respective resiliently deformable members 87 being secured directly to the upper leaf 81 and the lower clamping plate 92.

Thus, in this fifth embodiment, during small, isolation deflections of the suspension, the resiliently deformable members 87 shear in the fore-and-aft direction of the vehicle, providing low frictional resistance between the spring leaves 81,82. During larger deflections of the suspension when the resilient deformation of the members 87 has reached the positive stop, resulting relative movement against friction between the leaves 81,82 occurs, with movement of the lower leaf 82 being accommodated by the elongated holes 86 therein.

This creates low force transmission during shearing deformation of the resilient members 87 and, hence, ride isolation but high frictional control of the suspension during larger movements thereof.

A sixth embodiment of leaf spring suspension friction control assembly and associated friction control device in accordance with the invention is shown in FIGS. 8A and 8B. In this embodiment, a pair of upper and lower spring leaves 221, 222 are separated by a friction control device 229 similar to the friction control devices 29 and 59 described above with reference to FIGS. 2 and 5. However, in this sixth embodiment, the device 229 is provided with a pair of spaced, outwardly projecting ears 225, 226 on each opposed side thereof. Between each opposed pair of ears 225, 226 extends upwardly an arm 227 of a conventional spring clip. The transverse base 228 of the clip extends beneath the lower spring leaf 222 and is secured thereto by a rivet(s) 230 (not shown in FIG. 8B) passing therethrough and also through the lower metal plate 224 of the friction control device 229. Thus, that plate 224 is secured firmly to the lower spring leaf 222. The opposed pairs of ears 225, 226 are formed or otherwise provided on the upper metal plate 223 of the friction control device 229 and the ears 225, 226 of each pair are spaced from the opposed edges of the associates arm 227 of the spring clip.

Thus, for small deflections of the suspension, relative movement between the upper and lower leaves 221, 222 in the fore-and-aft direction X of the vehicle occurs by shearing deformation of the resiliently deformable member 220 of the friction control device. Such deformation is limited by the positive stop provided when the opposed arms 227 of the spring clip engage one or other of the ears 225, 226 on opposed sides of the device 229. For larger deflections of the suspension, any subsequent relative movement of the spring leaves 221, 222 occurs against sliding frictional movement between the upper leaf 221 and the upper plate 223 of the device 229.

A bolt 231 is employed to retain the upper ends of the arms 227 of the spring clip in proper position.

Figure 9C:
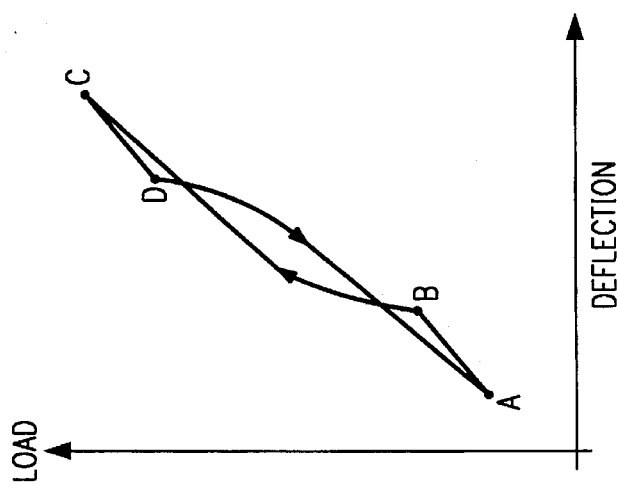
FIG. 9A, 9B and 9C are respective graphs of load versus deflection characteristics of two prior art leaf spring suspension assemblies and one assembly in accordance with the invention.
Figure 9B:
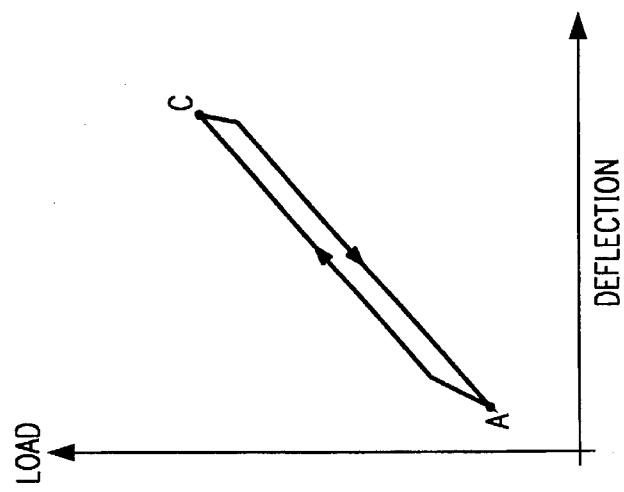
Figure 9A:
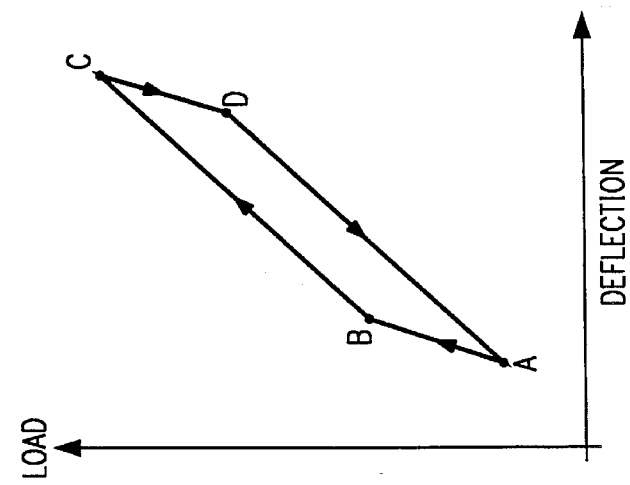

FIGS. 9A, 9B and 9C are graphs showing typical loading and unloading hysteresis curves for a two leaf parabolic suspension spring which is mounted by rubber bushes and shackles in a conventional manner and which is generally deflected by ±1.0 inches at 1 Hz. This form of spring, even without any friction control device, exhibits very low levels of friction compared with most current and traditional suspensions used on trucks.

FIG. 9A shows the hysteresis curve for the two leaf parabolic suspension spring with no friction control device, FIG. 9B shows the hysteresis curve for the spring with the prior art friction control device of FIG. 1 and FIG. 9C shows the hysteresis curve for the same spring but with the inventive friction control device used.

Referring to FIG. 9A, starting at point A, the spring deflects initially to point B, having to break the static friction. Typically, testing shows that this takes place at about 0.25 inches spring deflection and the effective spring rate is over double the spring measured nominal rate. From point B, the spring then continues to deflect to point C. The typical rate for this part of the curve (B to C), against sliding friction, is around 1.2 to 1.3 times the nominal rate. The spring then returns to point A in a similar manner.

In FIG. 9B, the spring deflects from point A to point C and returns to point A at a rate of only just over nominal, this being modified only by the bushes and resistance of the shear of the resiliently deformable member of the prior art friction control device.

In FIG. 9C, the spring deflects initially from point A to point B at a similar rate to that in FIG. 9B. At a point which can be adjusted to suit vehicle ride and handling, the positive stop becomes effective and the plate to leaf friction modifies the spring rate to a similar value as FIG. 9A. This friction can be increased by clamping the assembly, as described above in relation to FIG. 5, to provide better control, without affecting the initial ride/isolation deflection A to B/C to D.

The three curves of FIGS. 9A to 9C are for spring deflections of about 1.0 inches, which occur during severe vehicle movement. The primary ride isolation can occur with spring deflections under 0.25 inches and, under these circumstances, the isolation rate is improved from the already good two leaf spring and by nearly one half for the springs with friction control devices, namely those having the hysteresis curves of FIGS. 9B and 9C. However, under more violent vehicle movements, the control energy absorption can be represented as the area under the curves. Thus, it can be seen that such control with the curve of FIG. 9A is superior to that of FIG. 9B but that FIG. 9C shows better control than FIG. 9A, with having the superior primary isolation ride.

It is to be appreciated that the inventive suspension assembly and friction control device can provide an accurately positioned positive stop for deformation of the resiliently deformable member in the fore-and-aft direction of the suspension which has many practical advantages, for example:

1. It can be used to control accurately the desired transition point between low shearing resistance of the resiliently deformable member and the sliding against friction of the suspension spring leaf and another component of the suspension under large deflections thereof, to suit the ride and handling characteristics required from, say a heavy goods vehicle, during normal and abnormal operation;
2. These transition points can be changed quite simply during vehicle development and to suit various vehicle applications;
3. As the plates of the friction control device are moving constantly during normal operation, a large degree of corrosion build-up can be prevented;
4. The positive stop occurs long before any high shear forces are created in the elastomeric material from which the resiliently deformable member is made, thus protecting that member and creating high durability, as well as allowing the use of low cost elastomeric parts;
5. As the shear deflection is reduced, the thickness of the resiliently deformable member can be reduced and, if necessary, one or more of the device plates and any clamping plates can be omitted, thereby providing considerable cost reductions and suspension assembly heights; and
6. In some cases, by providing progressive build-up to the positive stop, excessive shock loadings can be reduced and the assembly could be fine tuned to provide even further control variation between different spring loadings and vehicle operating conditions.

I claim:

1. A vehicle suspension friction control assembly comprising:

a vehicle suspension having at least two components which are movable with respect to each other in the fore-and-aft direction of the suspension and of which at least one is a spring leaf;

a friction control device including a resiliently deformable member and a first plate, which friction control device is located between said at least two suspension components; and positive stop means which engages said first plate to limit deformation of the resiliently deformable member in said fore-and-aft direction to a predetermined limited degree;

wherein said at least two suspension components are movable with respect to each other against sliding friction in said fore-and-aft direction subsequent to the resiliently deformable member having been deformed to said predetermined limited degree.

2. An assembly according to claim 1, wherein said positive stop means includes means for effecting a progressively increasing resistance to deformation of the resiliently deformable member.

3. An assembly according to claim 1, wherein the friction control device includes a second plate, said plates are generally parallel, the resiliently deformable member is secured between said plates, and said positive stop means includes respective means arranged on said plates to interengage with each other when the resiliently deformable member has been deformed to said predetermined limited degree, whereby any subsequent relative movement between said at least two suspension components in said fore-and-aft direction is against sliding friction between at least one of said at least two suspension components and at least one of said plates.

4. An assembly according to claim 3, wherein said positive stop means comprises opposed ends of each plate being bent inwardly with respect thereto, such that corresponding pairs of respective bent plate ends interengage to provide said positive stop when the resiliently deformable member has been deformed to said predetermined limited degree.

5. An assembly according to claim 4, wherein said positive stop means includes means for effecting a progressively increasing resistance to deformation of the resiliently deformable member.

6. An assembly according to claim 5, wherein said progressively increasing resistance means comprises a resiliently deformable element arranged to act between said plates.

7. An assembly according to claim 6, wherein said progressively increasing resistance means comprises respective resiliently deformable elements arranged to act between respective cooperating pairs of interengageable bent plate ends.

8. An assembly according to claim 3, wherein said at least two components of the vehicle suspension are leaves of a multi-leaf spring of which at least one of said leaves is arranged to slide in frictional engagement with a corresponding one of the two generally parallel plates of the friction control device when the resiliently deformable member has been deformed to said predetermined limited degree.

9. An assembly according to claim 8, wherein said plate interengagement means comprises opposed ends of each plate being bent inwardly with respect thereto, such that corresponding pairs of respective bent plate ends interengage to provide the positive stop when the deformable member has been deformed to said predetermined limited degree.

10. An assembly according to claim 9, wherein said positive stop means includes means for effecting a progressively increasing resistance to deformation of the resiliently deformable member.

11. An assembly according to claim 10, wherein said progressively increasing resistance means comprises a resiliently deformable element arranged to act between the pair of generally parallel plates of the friction control device.

12. An assembly according to claim 11, wherein said progressively increasing resistance means comprises respective resiliently deformable elements arranged to act between respective cooperating pairs of interengageable bent plate ends.

13. An assembly according to claim 8 including means for clamping the leaves of the multi-leaf spring together and another resilient element located between said clamping means and at least one of the spring leaves.

14. An assembly according to claim 13, wherein the other resilient element is secured to a clamp plate of said clamping means.

15. An assembly according to claim 1, wherein the resiliently deformable member is secured directly to a first one of said at least two suspension components and to the first plate, a second one of said at least two suspension components and the first plate being slidable with respect to each other against friction when the deformable member has been deformed to said predetermined limited degree.

16. An assembly according to claim 15, wherein a second one of said at least two suspension components is a spring leaf.

17. An assembly according to claim 16, wherein the first suspension component to which the resiliently deformable member is secured is a spring leaf.

18. An assembly according to claim 1, wherein the first plate of the friction control device is suitably shaped to act as a cam in a cam and leaf spring suspension arrangement, the resiliently deformable member is secured between the first plate and a frame mounting bracket of the suspension, and the first plate is arranged upon the spring leaf of the suspension, whereby relative movement between the frame mounting bracket and the spring leaf which would otherwise cause further deformation of the resiliently deformable member beyond said predetermined limited degree causes sliding motion against friction between first plate and the spring leaf.

19. An assembly according to claim 1, wherein the at least two components are spring leaves, the friction control device is located between the spring leaves, and the spring leaves and the friction control device are secured together by an elongate clamping member passing through respective holes in at least one of the spring leaves and the friction control device, there being clearances between the elongate clamping member and the respective peripheries of the hole in the friction control device and the hole in said at least one of the spring leaves, the clearance, in said fore-and-aft direction, between the elongate clamping member and the periphery of the hole in said at least one of the spring leaves being greater than that between the elongate member and the periphery of the hole in the friction control device, said positive stop means being defined by the elongate clamping member and the periphery of the hole in the friction control device with which the elongate clamping member is engageable when the resiliently deformable member has been deformed to said predetermined limited degree.

20. An assembly according to claim 19, wherein the friction control device includes a second plate, said plates are generally parallel, and the resiliently deformable member is secured between said plates.

21. An assembly according to claim 19, wherein the spring leaves and friction control device are clamped together by a pair of opposed clamping plates secured together in a clamping relationship by the elongate clamping member.

22. An assembly according to claim 21, including a second friction control device located between one of the spring leaves and one of the clamping plates, which second friction control device includes a plate and a resiliently deformable member.

23. An assembly according to claim 22, wherein the resiliently deformable member of the second friction control device is secured directly to the one clamping plate.

24. An assembly according to claim 19, including another elongate clamping member.

25. An assembly according to claim 1, wherein the friction control device includes a second plate and the at least two suspension components are spring leaves between which the friction control device is located, said plates are generally parallel, the resiliently deformable member is secured between said plates, and at least one of said plates is in engagement with a first one of the spring leaves, and wherein said positive stop means includes an ear protruding outwardly of said friction control device from at least one of the parallel plates, which ear engages with another component of the suspension when the deformable member has been deformed to said predetermined limited degree, whereby any subsequent relative movement between the spring leaves in said fore-and-aft direction is against sliding friction between said at least one parallel plate and the first one of the spring leaves.

26. An assembly according to claim 25, wherein the other component of the suspension with which the ear engages is a suspension clip.

27. An assembly according to claim 25, wherein said at least one parallel plate is secured to the first one of the spring leaves and the ear protrudes from the other one of the parallel plates.

28. An assembly according to claim 1, wherein the vehicle suspension includes a radius arm attached to an associated spring leaf thereof by connecting means incorporating the friction control device.

29. An assembly according to claim 1, wherein the vehicle suspension includes a radius arm attached to an associated axle of the vehicle suspension by connecting means incorporating the friction control device.

30. An assembly according to claim 1, wherein the vehicle suspension includes a stabilizer bar attached to an associated spring leaf of the suspension by connecting means incorporating the friction control device.

31. An assembly according to claim 1, wherein the resiliently deformable member of the friction control device is constructed of an elastomeric material.

32. An assembly according to claim 1, wherein the friction control device and one of the at least two components of the suspension define respective surfaces which interengage with each other when the resiliently deformable member has been deformed to said predetermined limited degree, thereby defining said positive stop means.

33. An assembly according to claim 1, wherein the friction control device includes respective surfaces which interengage with each other when the resiliently deformable member has been deformed to said predetermined limited degree, thereby defining said positive stop means.

* * * * *